United States Patent
Yamaoka et al.

(10) Patent No.: US 9,179,605 B2
(45) Date of Patent: Nov. 10, 2015

(54) ELECTRIC PRUNER WITH A QUICK-RELEASE MECHANISM

(75) Inventors: Toshinari Yamaoka, Nanjing (CN); Qi Zhang, Nanjing (CN)

(73) Assignee: Chervon (HK) Limited, Hong Kong (HK)

( * ) Notice: Subject to any disclaimer, the term of this patent is extended or adjusted under 35 U.S.C. 154(b) by 576 days.

(21) Appl. No.: 13/546,714

(22) Filed: Jul. 11, 2012

(65) Prior Publication Data

US 2013/0019482 A1 Jan. 24, 2013

(30) Foreign Application Priority Data

Jul. 22, 2011 (CN) .......................... 2011 1 0206372

(51) Int. Cl.
- *B26B 13/04* (2006.01)
- *B26B 15/00* (2006.01)
- *A01G 3/037* (2006.01)

(52) U.S. Cl.
CPC ................ *A01G 3/037* (2013.01); *B26B 13/04* (2013.01); *B26B 15/00* (2013.01)

(58) Field of Classification Search
CPC ........ B26B 15/00; B26B 13/04; A01G 3/033; A01G 3/037
USPC ........ 30/228, 249, 247, 251, 241, 272.1, 276, 30/277.4, 227, 266
See application file for complete search history.

(56) References Cited

U.S. PATENT DOCUMENTS

| | | | | |
|---|---|---|---|---|
| 2,003,924 A * | 6/1935 | Curtis | .......... | 279/19.1 |
| 2,500,038 A * | 3/1950 | Lear | .............. | 279/19.1 |
| 2,675,250 A * | 4/1954 | Paquin | .................... | 137/614.02 |
| 2,911,224 A * | 11/1959 | Keir et al. | .................... | 279/19.5 |
| 3,631,596 A * | 1/1972 | Glaus | ............................ | 30/228 |
| 3,865,198 A * | 2/1975 | Price | ............................ | 173/133 |
| 4,233,737 A * | 11/1980 | Poehlmann | .................... | 30/335 |
| 6,178,643 B1 * | 1/2001 | Erbrick et al. | .................. | 30/228 |
| 6,260,281 B1 * | 7/2001 | Okumura et al. | .............. | 30/392 |
| 6,367,156 B1 * | 4/2002 | Herrmann et al. | .............. | 30/228 |
| 6,966,735 B1 * | 11/2005 | Yamazaki | ..................... | 411/149 |
| 8,434,234 B2 * | 5/2013 | Chen et al. | ....................... | 30/228 |
| 2010/0077621 A1 * | 4/2010 | Quigley et al. | ................ | 30/228 |
| 2010/0192383 A1 * | 8/2010 | Ishiguro | ......................... | 30/228 |
| 2011/0214292 A1 * | 9/2011 | Heh | ............................... | 30/228 |
| 2012/0038119 A1 * | 2/2012 | Koch et al. | .................... | 279/19.1 |
| 2013/0247348 A1 * | 9/2013 | Kitagawa et al. | .......... | 29/402.08 |
| 2014/0191481 A1 * | 7/2014 | Kawakami et al. | ........... | 279/142 |

* cited by examiner

*Primary Examiner* — Ned Landrum
*Assistant Examiner* — Fernando Ayala
(74) *Attorney, Agent, or Firm* — Greenberg Traurig, LLP

(57) ABSTRACT

An electric pruner includes a housing, a motor accommodated within the housing, a transmission mechanism, a movable blade, and a fixed blade extending from the front end of the housing. The fixed blade is fixedly mounted on the housing, and the movable blade is rotatably connected to the fixed blade via a shaft and driven by the motor via the transmission mechanism. A locking device manually operable by the user is arranged on the shaft for locking the movable blade, the locking device being switchable between a first position where the movable blade is locked to stay connected with the transmission mechanism and a second position where the movable blade is releasable from the transmission mechanism. Thus, the replacement of the movable blade is very simple and convenient.

7 Claims, 5 Drawing Sheets

ELECTRIC PRUNER WITH A QUICK-RELEASE MECHANISM

CROSS REFERENCE TO RELATED APPLICATION

This application is a non-provisional application claiming priority from Chinese Application CN 201110206372.6, filed on Jul. 22, 2011, the disclosure of which is incorporated herein by reference in its entirety.

FIELD OF THE DISCLOSURE

The present description relates generally to an electric pruner and, more particularly, to a quick replacing structure for the blade of the electric pruner.

BACKGROUND OF RELATED ART

As a kind of garden tool, the electric pruner is often used during garden pruning due to its compact size and simple portability. This kind of the electric pruner comprises a movable blade and a fixed blade fixedly mounted on the housing, wherein the movable blade is rotatably connected to the fixed blade and can be driven by a motor via a transmission mechanism to swing back and forth so as to perform cutting.

During operation, the fixed blade provides support, and the movable blade serves to cut. Typically, however, because the movable blade has a small cutting edge angle and is relatively thin, the movable blade is easy worn. As a result, the cutting edge of the movable blade can become blunt, which adversely affects the cutting efficiency and the cutting effect. As such, the movable blade typically must be replaced frequently.

Currently, for most of electric pruners on the market, it is oftentimes necessary to detach the housing when replacing the movable blade, and thus the replacement work is very troublesome. Although it is not necessary to detach the housing for a very few kinds of electric punning shears, it is still necessary to remove the bolts connecting the movable blade and the fixed blade, and the steps for replacing the blade are still troublesome.

Thus, there is an urgent need for an electric pruner whose movable blade can be replaced simply and more conveniently without detaching any one of the parts thereof.

SUMMARY

To solve at least some of the above problems, the presently disclosed electric pruner provides a device wherein the replacement of the movable blade is simple and convenient, avoiding the requirement of removing any part.

As such, an electric pruner is provided. The electric pruner comprises a housing, a motor accommodated within the housing, a transmission mechanism, a movable blade, and a fixed blade extending from the front end of the housing, wherein the fixed blade is fixedly mounted on the housing, and the movable blade is rotatably connected to the fixed blade via a shaft and driven by the motor via the transmission mechanism. A locking device manually operable by the user is arranged on the shaft for locking the movable blade, the locking device being switchable between a first position where the movable blade is locked to stay connected with the transmission mechanism and a second position where the movable blade is released to be detachable from the transmission mechanism.

With the above arrangements, when the movable blade needs to be replaced, the user only needs to directly operate the locking device to switch it to the released position, the movable blade would then be unlocked. Once unlocked, the movable blade can be directly pulled out by the user for replacement. When installing a new movable blade, the user only needs to insert the movable blade into the housing and then return the locking device to the locked position, then the movable blade is locked. During the whole replacement course of the blade, it is not necessary for the user to remove any part and to use any other auxiliary tools. Because the directly manual operation of the locking device would lock or release the movable blade, the replacement work is very simple and convenient.

DETAILED DESCRIPTION

Figure 1:
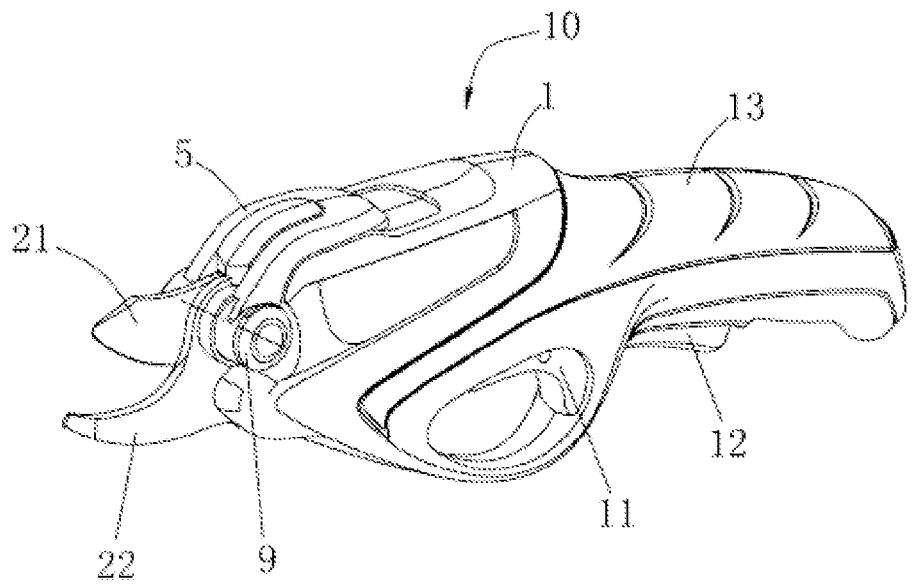
FIG. 1 is a perspective view of an example electric pruner according to the present disclosure.

FIG. 1 is a perspective view of one example electric pruner in accordance with the teachings of the present disclosure. As shown in FIG. 1, the electric pruner 10 comprises a housing 1 including a motor 14, a transmission mechanism 3, and a built-in battery (not shown) accommodated within the housing 1. A switching trigger 11 and a safety switch 12 are mounted under the housing 1 so as to control the motor 14. A gripping portion 13 is formed by the rear portion of the housing 1. A movable blade 21 and a fixed blade 22 extend from the front end of the housing 1, wherein the fixed blade 22 is fixedly mounted in the housing 1 by a bolt or the like, and the movable blade 21 is rotatably connected to the fixed blade 22 by a shaft 4. In the present example, the shaft 4 is embodied as a bolt.

Figure 2:
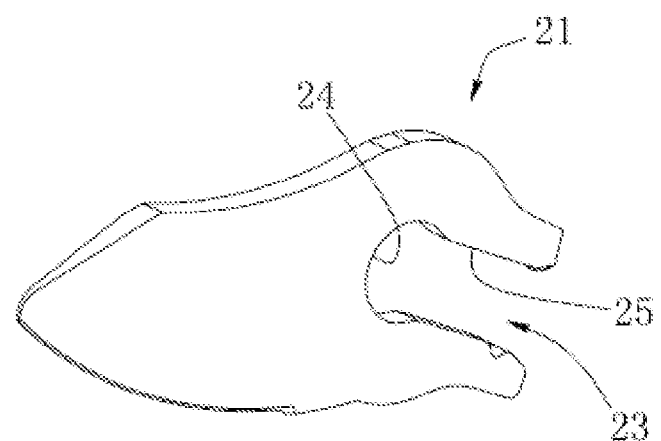
FIG. 2 is an enlarged view of a movable blade of the electric pruner.

As shown in FIG. 2, the movable blade 21 is provided with a groove 23 which comprises a first groove portion 24 and a second groove portion 25 in communication with each other. The first groove portion 24 is circular-shaped and the second groove portion 25 is elongated, wherein the circular-shaped groove 24 is sized larger than the elongated groove 25.

Figure 3:
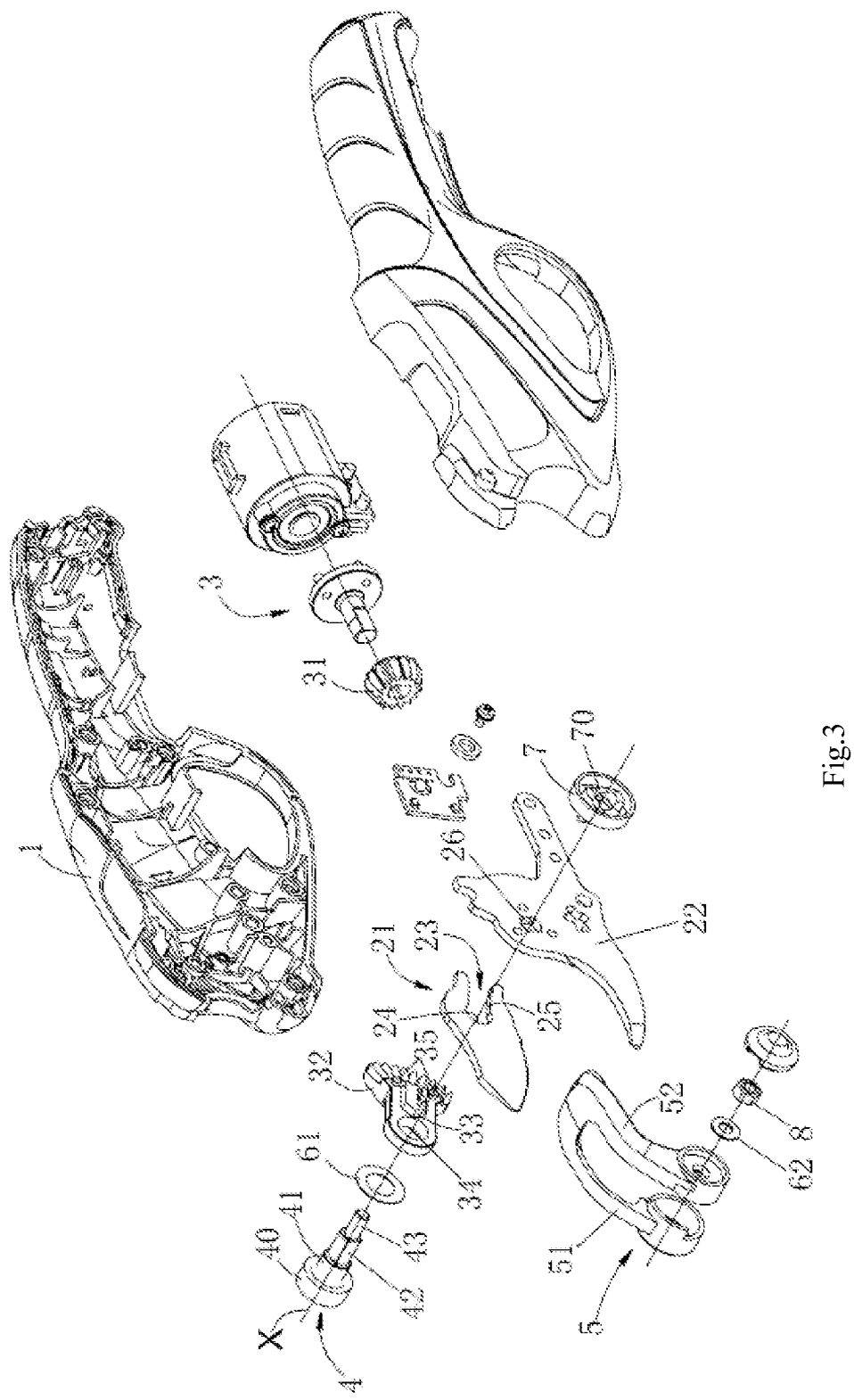
FIG. 3 is an exploded view of the example electric pruner.

As shown in FIG. 3, the transmission mechanism 3 comprises a bevel gear pair meshed with each other. The bevel gear pair comprises a first bevel gear 31 and a second bevel gear 32 being substantially fan-shaped. With this arrangement, when the first bevel gear 31 is driven to rotate by the motor 14, the second bevel gear 32 swings back and forth. The second bevel gear 32 is provided thereon with a boss 33 engageable with the second groove portion 25 of the movable blade 21 and a pair of stop elements 35 for abutting against one end surface of the movable blade 21 for defining the position of the movable blade 21. The movable blade 21 is then driven by the second bevel gear 32 to swing back and forth to perform a cutting motion.

The installation of the movable blade 21 and the quick-locking device will be described next. The quick-locking device can be directly operated by the user so as to be switched between a locking position and a release position. "Directly operated" as mentioned herein indicates that the quick-locking device is manually operated directly by the user without requiring any other auxiliary tools.

Figure 4:
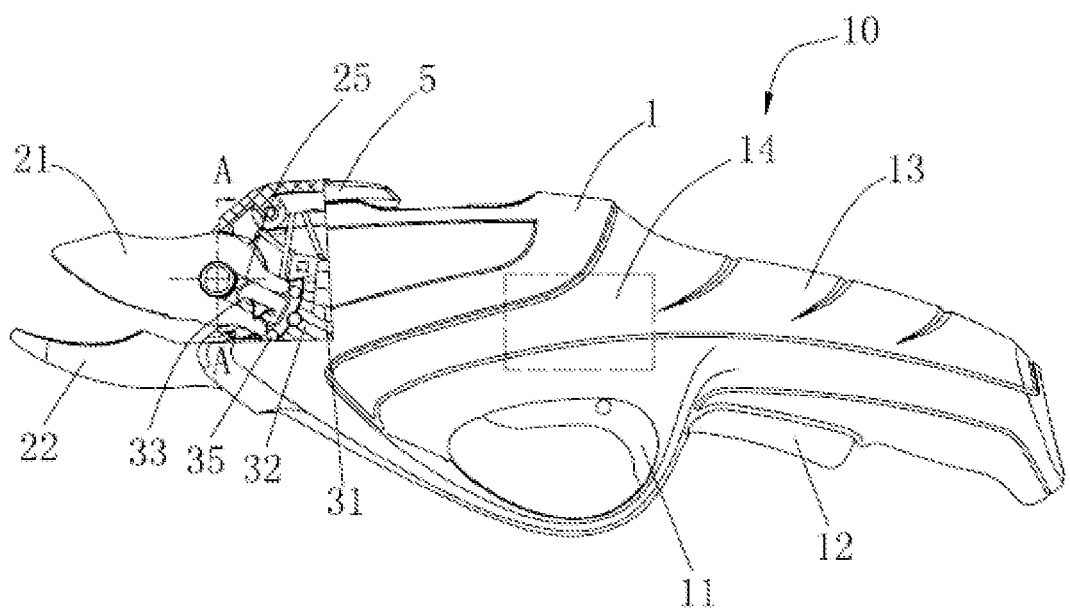
FIG. 4 is a plan view of the electric pruner, wherein a portion of the housing is removed and a quick-locking spanner is in a locked position.
Figure 5:
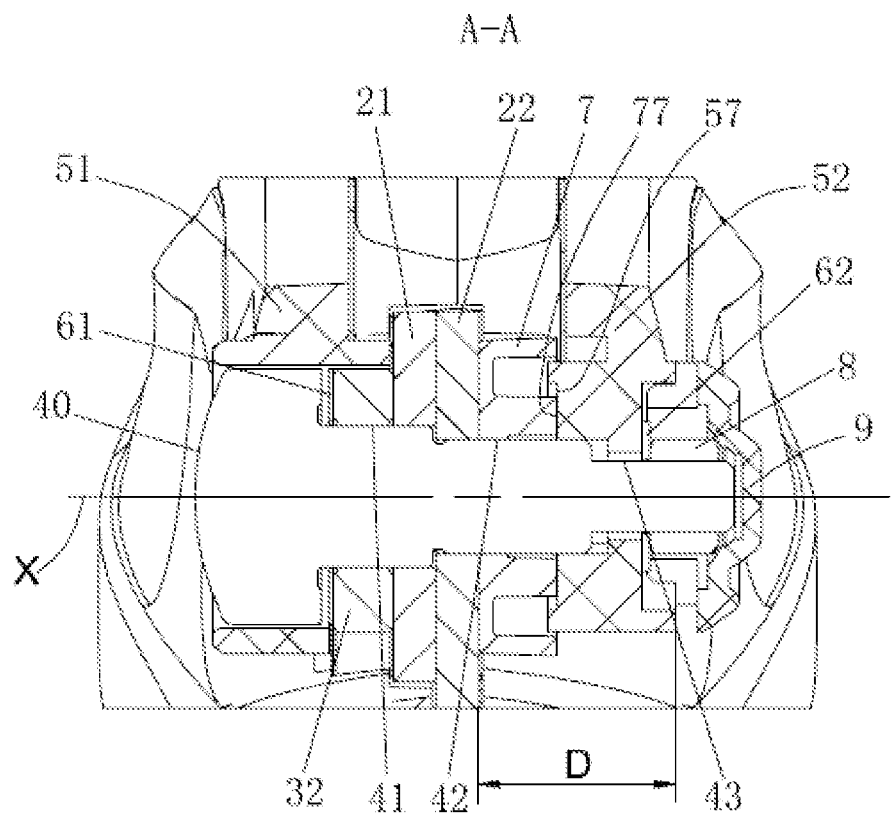
FIG. 5 is a sectional view taken along the line A-A in FIG. 4.

As shown in FIG. 3 to FIG. 5, from the left side to the right side of FIGS. 3 and 5, the bolt 4 passes through, in order, a first arm 51 of a quick-locking spanner 5, a spring washer 61, a hole 34 on the second bevel gear 32, the circular groove 24 of the movable blade 21, a square hole 26 on the fixed blade 22, a hole 70 on the flange 7, a second arm 52 of the quick-locking spanner 5 and a washer 62. The bolt 4 is step-shaped, comprising a head 40, a first mating portion 41, a second mating portion 42, and a third mating portion 43. Moreover, from the first mating portion 41 to the third mating portion 43, the diameter of the bolt 4 gradually decreases, wherein the second mating portion 42 is flat and mated with the square hole 26 on the fixed blade 22 and the square hole 70 of the flange 7. As a result, the fixed blade 22 and the flange 7 cannot be rotated relative to the bolt 4. The third mating portion 43 is provided with threads for engaging with a lock nut 8. A nut cap 9 is mounted on the second arm 52 of the quick-locking spanner 5 for covering the lock nut 8.

The quick-locking device of the movable blade 21 comprises a first engaging element 5 and a second engaging element 7 engaged with each other, wherein the first engaging element 5 is an operation member directly operated by the user which is embodied as a quick-locking spanner, and the second engaging element 7 is embodied as a flange. The quick-locking spanner 5 can be rotated between the locked position and the released position relative to the flange 7.

Figure 6:
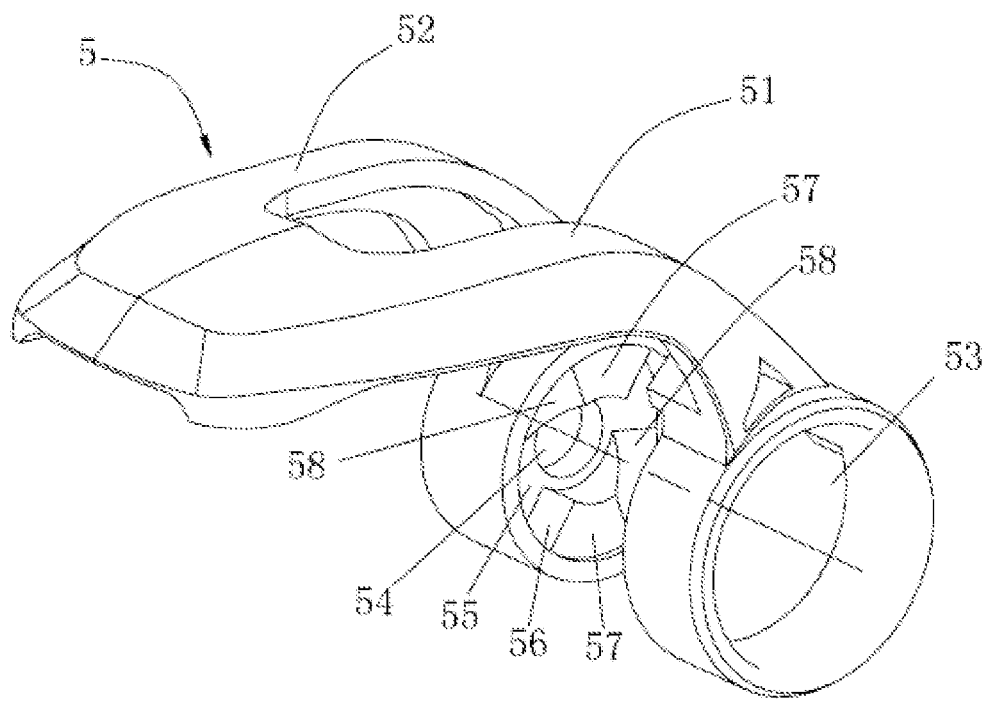
FIG. 6 is an enlarged view of the quick-locking spanner.

As shown in FIG. 6, the operation element, namely the quick-locking spanner 5, comprises at least one first end surface boss 56 having an inclined plane, and accordingly, the flange 7 mounted on the shaft 4 comprises at least one second end surface boss 76 having an inclined plane, wherein the first end surface boss 56 and the second end surface boss 76 are meshed with each other.

Figure 7:
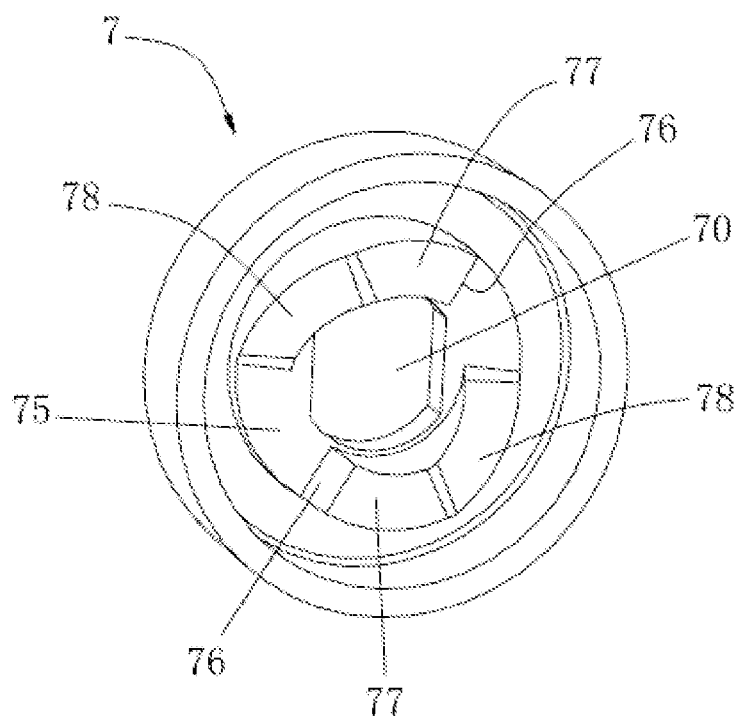
FIG. 7 is an enlarged view of a flange.

Specifically, in the present example, the quick-locking spanner 5 is substantially U-shaped, which comprises the first arm 51 and the second arm 52. The first arm 51 is provided at its free end with a first cylindrical hole 53 engageable with the head 40 of the bolt 4. The second arm 52 is provided on its free end with a second cylindrical hole 54 smaller than the first cylindrical hole 53 and engageable with the third mating portion 43 of the bolt 4. A pair of first end surface bosses 56 is provided on a lowest plane 55 facing towards the first arm within the second cylindrical hole 54, each of first end surface bosses comprising a highest plane 57 and an inclined plane 58 extending from the highest plane 57 to the lowest plane 55. Under the assembled state, the second arm 52 of the quick-locking spanner 5 is adjacent to the flange 7. Correspondingly, a pair of second end surface bosses 76 are provided on a lowest plane 75 facing towards the second arm 52 within the hole 70 of the flange 7, with the shape thereof being the same as that of the first end surface bosses 56, as shown in FIG. 7. Accordingly, each of the second end surface bosses also comprises a highest plane 77 and an inclined plane 78 extending from the highest plane 77 to the lowest plane 75. The first end surface bosses 56 and the second end surface bosses 76 are mated with each other so as to release or lock the movable blade 21.

As shown in FIGS. 1, 4 and 5, the quick-locking spanner 5 leans on the top surface of the housing 1 in its locked position. In this state, the first mating portion 41 is engaged with the hole 34 on the second bevel gear 32 and the circular groove 24 on the movable blade 21. Moreover, the highest plane 77 of the second end surface boss 76 of the flange comes into contact with the highest plane 57 of the second end surface boss 56 of the second arm of the quick-locking spanner. At this time, the distance in the axial direction X of the bolt 4 between the flange 7 and the second arm 52 of the quick-locking spanner reaches the maximum such that the bolt 4 overcomes the elastic force of the spring washer 61 to compress the spring washer 61. As a result, the second bevel gear 32, the movable blade 21, the fixed blade 22, the flange 7 and the second arm 52 of the quick-locking spanner are arranged in a compact manner between the head 40 of the bolt 4 and the locking nut 8, and thus the movable blade 21 is locked.

Figure 9:
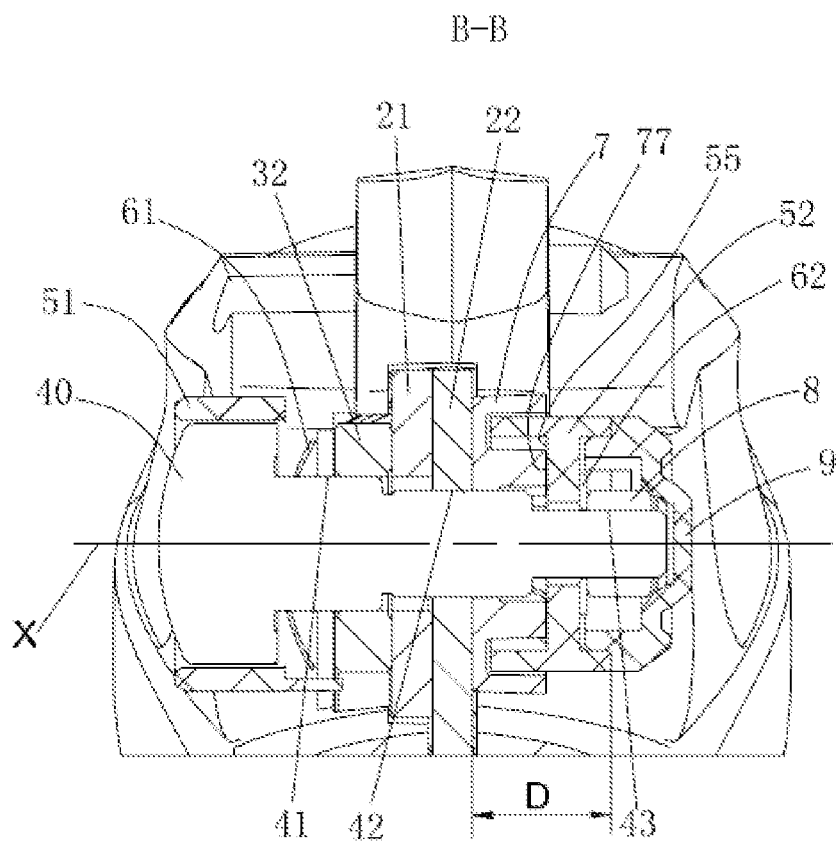
FIG. 9 is a sectional view taken along the line B-B in FIG. 8.

When driven by the quick-locking spanner 5, the shaft (i.e. the bolt 4) is movable between a first position (i.e. the position as shown in FIG. 5) where the first mating portion 41 of the bolt 4 is mated with the groove 23 formed on the movable blade 21 and a second position (i.e. the position as shown in FIG. 9) where the second mating portion 42 is positioned in the groove 23.

Figure 8:
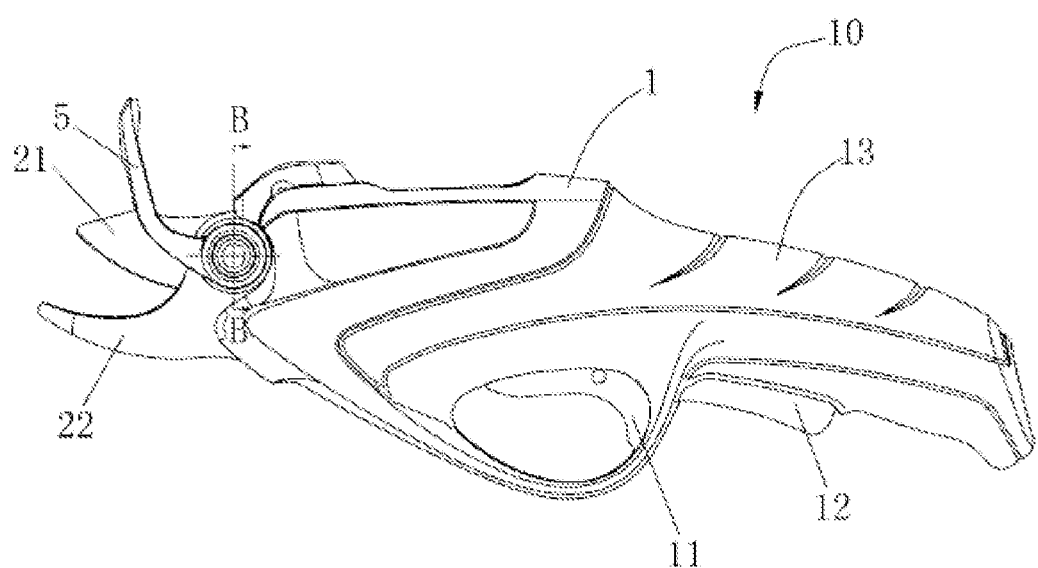
FIG. 8 is a plan view of the electric pruner, wherein the quick-locking spanner is in a released position.

As shown in FIGS. 8 and 9, the quick-locking spanner 5 is rotated away from the top surface of the housing 1 to the released position. Along with the rotation of the quick-locking spanner 5, the first end surface boss 56 is rotated relative to the second end surface boss 76, then, the highest plane 57 of the first end surface boss is rotated to the lowest plane 75 of the second end surface boss along the inclined plane 78 of the second end surface boss. As a result, the first end surface boss 56 and the second end-surface boss 76 are engaged with the other; the highest plane 57 of the first end surface boss comes into contact with the lowest plane 75 of the second end surface boss; and the lowest plane 55 of the first end surface boss comes into contact with the highest plane 77 of the second end surface boss. In this state, the axial distance D between the flange 7 and the quick-locking spanner 5 reaches the minimum. Accordingly, the spring washer 61 restores to its original shape, the elastic force of which makes the bolt 4 move to the left side of FIG. 9 such that the second mating portion 42 of the bolt moves to the circular groove 24 of the movable blade. At this time, because the outer diameter of the second mating portion 42 is smaller than the inner diameter of the circular groove 24 and slightly smaller than the width of the long-shaped groove 25, the movable blade 21 can be directly pulled out for replacement.

With the above arrangements, when the worn movable blade needs to be replaced, the user only needs to move the quick-locking spanner 5 to the released position as shown in FIG. 8 and then to pull out the movable blade 21 for replacement. When installing a new movable blade, the user inserts the new movable blade into the housing 1 first. During insertion, the groove 23 of the movable blade passes through the bolt 4 first, and then the long-shaped groove 25 slides along the two sides of the boss 33 of the second bevel gear. The movable blade 21 is installed in its suitable position until the end surface of the movable blade 21 abuts against the stop elements 35 of the second bevel gear. At this time, the user moves the quick-locking spanner 5 to enable it to rotate to lean against the top surface of the housing 1 (as shown in FIG. 1), the movable blade is then locked. During the whole course of the replacement, the replacement of the blade can be achieved without requiring the removal of any part and without requiring the help of other auxiliary tools, thus, the replacement of the blade is very simple and convenient.

In another example of the present pruner, the quick-locking device may be omitted, with the other structures remaining substantially the same. In this instance only the nut 8 is rotated to contact with the fixed blade 22. In particular, in this example, when the movable blade 21 needs to be replaced, the user can rotate the nut 8 until it is released. In this way, under the restoring force of the spring washer 61, the bolt 4 moves toward the left side of FIG. 5 such that the second mating portion 42 moves to the groove 23 of the movable blade 21. At this time, the movable blade 21 can be directly removed for replacement. Conversely, when installing the new movable blade 21, insert the movable blade 21 first into the housing 1 and then screw the nut 8 up. In this example, because the blade has a thickness (e.g., 3 mm), the nut 8 must be rotated to move a corresponding distance (e.g., 3 mm) in the axial direction when the movable blade is released. During the course of replacing the blade in this example, the user only needs to loosen or screw up the nut 8, the movable blade can be released or locked without removing any part except the nut 8. Hence, the replacement work is simple and convenient and the deficiency of dropping out the part is avoided.

In the disclosed examples, the bolt 4 is step-shaped and the first mating portion 41 thereof and the second mating portion 42 thereof are two-stage necks respectively. When replacing the blade, the bolt 4 is axially moveable between the first position and the second position, and accordingly, the first mating portion 41 or the second mating portion 42 is driven to engage with the groove 23 of the movable blade 21 such that the movable blade is locked or released. In other examples, the first mating portion and the second mating portion of the bolt 4 can be provided on the same stage of the neck. The second mating portion is flat and the first mating portion is partially cylindrical. In this way, the first mating portion has an outside dimension larger than that of the second mating portion. When replacing the blade, the bolt is rotated between the first position and the second position, to drive the first mating portion or the second mating portion to engage with the groove 23 of the movable blade such that the movable blade is locked or released.

We claim:

1. An electric pruner, comprising:
    a housing;
    a motor accommodated within the housing;
    a transmission mechanism; and
    a movable blade and a fixed blade extending from the front end of the housing, wherein the fixed blade is fixedly mounted on the housing, and the movable blade is rotatably connected to the fixed blade via a shaft and driven by the motor via the transmission mechanism,
    wherein a locking device manually operable by the user is arranged on the shaft for locking the movable blade, the locking device comprising:
    a first engaging element comprising at least one first end surface boss having a highest plane and an inclined plane extending from the highest plane to a lowest plane on which the first end surface boss is provided;
    a second engaging element comprising at least one second end surface boss having a highest plane and an inclined plane extending from the highest plane to a lowest plane on which the second end surface boss is provided, and
    the first engaging element being rotatable between the locked position where the highest plane of the first end surface boss comes into contact with the highest plane of the second end surface boss so that the movable blade is locked to stay connected with the transmission mechanism and the released position where the highest plane of the first end surface boss comes into contact with the lowest plane of the second end surface boss so that the movable blade is released to be detachable from the transmission mechanism.

2. An electric pruner according to claim 1, wherein the movable blade is provided with a groove which comprises a first groove portion and a second groove portion, the first groove portion being sized larger than the second groove portion.

3. An electric pruner according to claim 2, wherein the shaft comprises a first mating portion and a second mating portion having an outer diameter smaller than that of the first mating portion, the second groove portion being sized larger than the outer diameter of the second mating portion.

4. An electric pruner according to claim 3, wherein, the shaft is movable by the locking device between the first position where the first mating portion is engaged with the first groove portion such that the movable blade is locked in position and the second position where the second mating portion is engaged with the first groove portion and the movable blade is released.

5. An electric pruner according to claim 4, wherein the shaft is a step-shaped bolt, and the second mating portion is flat and is engageable with a square hole formed on the fixed blade.

6. An electric pruner according to claim 5, wherein the shaft further comprises a third mating portion with threads provided thereon for engaging with a nut.

7. An electric pruner according to claim 6, wherein the first, second, and third mating portions of the shaft are stepped in diameter.

* * * * *